June 8, 1926.  G. E. KOEHLER  1,588,034
FRUIT HARVESTING IMPLEMENT
Filed Sept. 21, 1925
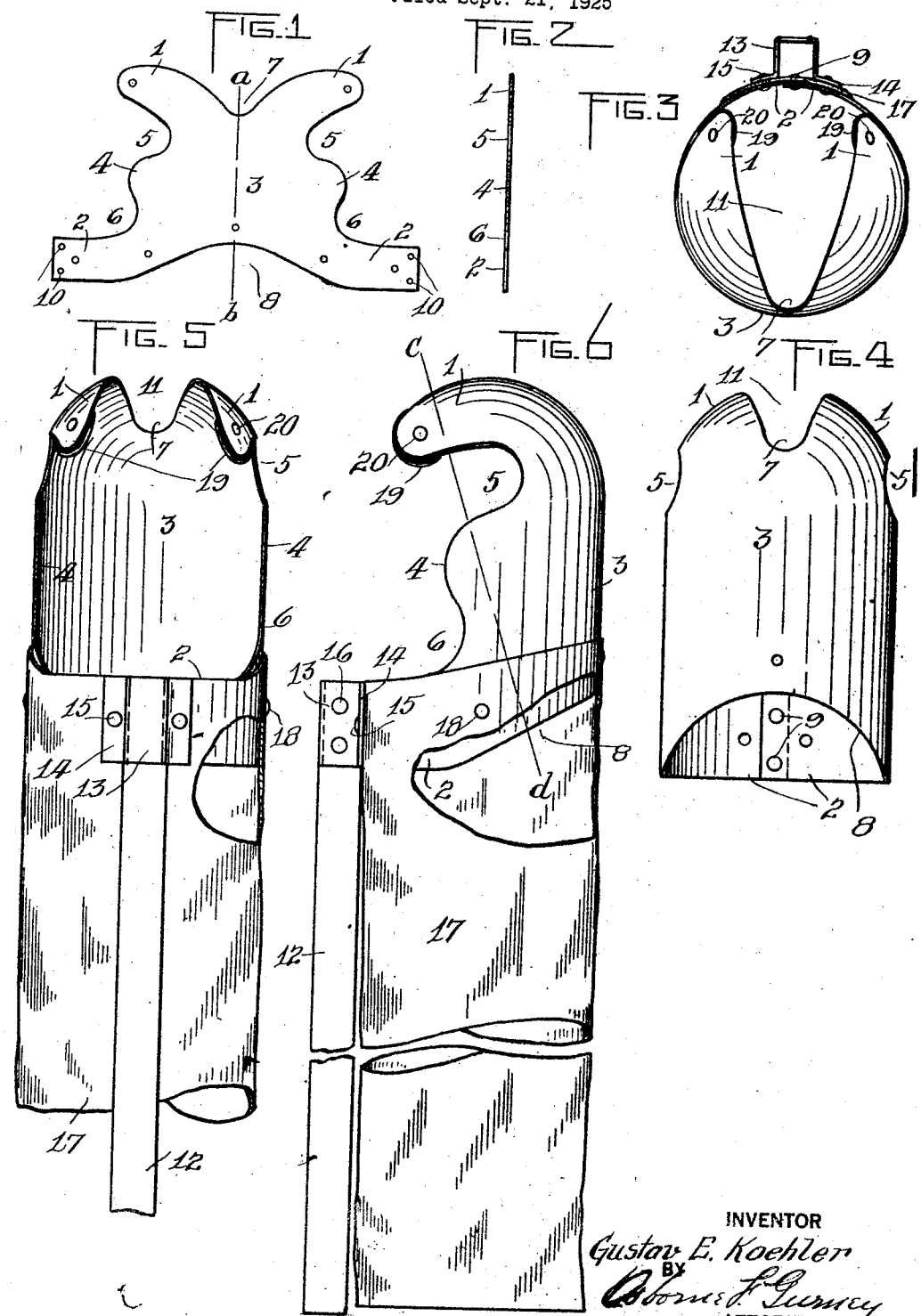
INVENTOR
Gustav E. Koehler
BY
ATTORNEY Patented June 8, 1926.

1,588,034

UNITED STATES PATENT OFFICE.

GUSTAV E. KOEHLER, OF ROCHESTER, NEW YORK.

FRUIT-HARVESTING IMPLEMENT.

Application filed September 21, 1925. Serial No. 57,741.

The present invention relates to a fruit harvesting means employing a picking member carried on the end of a pole for pulling fruit from trees and discharging it into a delivery chute communicating therewith, an object of the invention being to provide a device of this character which is of simple and practical construction and which may be used to good advantage in picking from the ground and without injury to the fruit.

And, a further object of the invention is the provision of a picking member of novel construction and formed from a one piece blank of sheet material.

To these ends the invention consists of a fruit picker constructed in the manner fully set forth in the following description and particularly defined in the appended claims.

The accompanying drawings illustrating the invention are as follows:—

Figure 1 is a plan view of the blank from which the picker member is formed.

Fig. 2 is an edge view of the blank.

Figs. 3 and 4 are top view and rear elevation, respectively, of the picker member.

And, Figs. 5 and 6 are front and side elevations, respectively, of the picker member with pole and chute attached.

In the drawings similar reference numerals refer to similar parts throughout the several views.

The picker member is formed, preferably, from a one piece sheet metal blank as shown in Fig. 1, such blank comprising, each side of a median line *a—b*, an outwardly and upwardly extending curved top finger 1 and a laterally extending and comparatively narrow bottom portion 2 which projects, as does the finger 1, from the body 3 of the blank, while intermediate the finger 1 and bottom portion 2 is a rounded lateral projection 4, the width of the blank across the projections 4 being less than that between the tips of the fingers 1. Intermediate each projection 4 and its respective finger 1 and bottom extension 2 the outline of the blank is inwardly curved to form recesses or sockets 5 and 6, respectively, while the top edges of the fingers 1 are jointd in a curved recess 7 centered on the median line *a—b*, the body portion of the blank at the bottom being cut away, as at 8, from a line coincident with the bottom edges of the portions 2.

In shaping a blank, such as just above described, into the picker member, a rounded ended cylindrical form is used and the blank placed thereon so that the body 3 with the projections 2 and 4 will be bent cylindrically and the fingers 1 will be bent over the spherically rounded top. Thus, such picker member comprises the cylindrically formed wall including the body 3 of the blank, the projections 4 and the bottom extensions 2, the upper part of such wall terminating in a pair of spherically curved tapering fingers 1, the bottom members 2 overlapping each other and being secured together by suitable means as rivets 9 passed through openings 10 therefor in the blank.

The picker member resembles somewhat the partially closed four fingers of a hand and engages the fruit in practically the same manner as a person would use the hand in picking. The fingers 1, which are spaced by the forwardly opening V-shape space 11 between them, engage over the fruit and pull it from the tree, the fruit being guided by the side projections or fingers 4 toward the open bottom of the cylinder end of the picker member.

The picker member is supported on the end of a suitable rod or pole 12 by means of a clamping strip 13 bent U-shape and having its flanged ends 14 riveted at 15 to the overlapping ends of the parts 2, the pole being held within the clamp by any suitable means as the pins 16.

In order to convey the fruit from the picking member to the ground a delivery chute 17 of canvas or the like is provided, such chute being secured to the cylinder bottom of the picking member by rivets 18. The fruit, pulled from the tree by the fingers 1, drops through the picker member substantially in the direction of the line *c—d*, Fig. 6, and, to the end of preventing the fruit from becoming bruised, the body 3 of the cylinder wall is cut away as at 8 so that the fruit will strike against the chute and not against the bottom edge of the cylinder wall. Pads 19 of rubber or other suitable material are fastened by rivets 20 to the outer or tip ends of the fingers 1 to prevent the fingers from cutting or otherwise injuring the fruit.

What I claim is:—

1. In a fruit harvesting implement of the character described, a picker member comprising a wall including a substantially semi-cylindrical body portion, a comparatively narrow bottom portion forming a complete circle, and round ended projections from the side edges of the body portion and in the curve thereof, said body portion terminating at its top in a pair of spaced spherically curved tapering fingers extending in the general direction of said projections.

2. In a fruit harvesting implement of the character described, a picker member comprising a wall including a substantially semi-cylindrical body portion, a comparatively narrow bottom portion forming a complete cylinder, and round ended projections from the side edges of the body portion and in the curve thereof, said body portion terminating at its top in a pair of spaced spherically curved tapering fingers extending in the general direction of said projections, the side edges of the body portion intermediate the rounded projections and said bottom portion and the projections and said fingers being rounded to form inwardly curved recesses.

3. In a fruit harvesting implement of the character described, a picker member comprising a wall including a substantially semi-cylindrical body portion, a comparatively narrow cylindrical bottom portion, and a pair of spaced spherically curved tapering fingers extending from the top of the body portion toward the open side thereof, the bottom edge of the said wall having a portion thereof inclined as and for the purpose set forth.

4. In a fruit harvesting implement of the character described, a picker member of sheet material and comprising a wall including a substantially semi-cylindrical body portion, a comparatively narrow cylindrical bottom portion, the side edges of said body portion being of irregular outline, a pair of spaced spherically curved tapering fingers extending from the top of the body portion toward the open side thereof, and pads secured to the outer ends of said fingers.

5. The combination in a fruit harvesting implement of the character described, of a picker member comprising a wall including a substantially semi-cylindrical body portion, a comparatively narrow cylindrical bottom portion, and a pair of spaced spherically curved tapering fingers extending from the top of the body portion toward the open side thereof; a delivery chute attached to the said bottom portion, and a pole for supporting the picker member.

6. The combination in a fruit harvesting implement of the character described, of a picker member comprising a wall including a substantially semi-cylindrical body portion, a comparatively narrow bottom portion forming a complete cylinder, and a pair of spaced spherically curved tapering fingers extending from the top of the body portion toward the open side thereof, the side edges of the body portion being of irregular outline and the bottom edge of the wall having a portion thereof inclined as and for the purpose set forth; a delivery chute attached to said bottom portion, and a pole for supporting the picking member.

GUSTAV E. KOEHLER.